Nov. 18, 1969  D. R. HOUGH  3,478,582
APPARATUS AND METHOD FOR MEASURING ROAD
CONTACT OF VEHICLE TIRES
Filed Sept. 21, 1967

INVENTOR.
DEAN R. HOUGH

BY *William J. Ruano* his ATTORNEY

United States Patent Office 3,478,582
Patented Nov. 18, 1969

3,478,582
APPARATUS AND METHOD FOR MEASURING ROAD CONTACT OF VEHICLE TIRES
Dean R. Hough, Pittsburgh, Pa., assignor of forty-five percent to George W. Kendall, Wheeling, W. Va., and ten percent to William J. Ruano, Pittsburgh, Pa.
Filed Sept. 21, 1967, Ser. No. 669,542
Int. Cl. B60c 23/02
U.S. Cl. 73—146.2                                 7 Claims

ABSTRACT OF THE DISCLOSURE

Method and apparatus for separately weighing the central and shoulder portions of a vehicle tire while supporting the vehicle weight, and then adjusting the pressure to insure that such portions weigh substantially the same, which is indicative of continuous and uniform gripping contact across the entire width of the tire tread, which, in turn, will assure maximum safety and maximum tire life.

Figure 1:
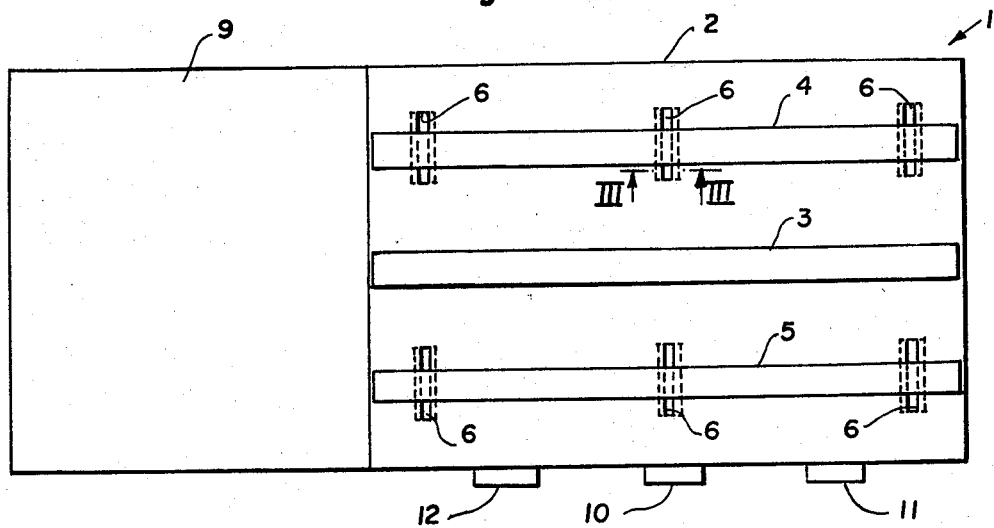

Separate platforms of three scales support the mounted tire and the relative weights borne by the shoulder and central portions of the tread are determined. The pressure of the tire is then varied so that such relative weights borne will be substantially equal.

---

This invention relates to a device for measuring the road surface contact area of a pneumatic tire while on a vehicle.

More specifically, this invention relates to an elongated, multi-unit scale device which measures the difference in weight between the shoulder portions and central portion of each of the four vehicle tires while mounted on a vehicle.

A major concern of owners of vehicles which use pneumatic tires is that of maintaining the proper pressure in the tires to achieve optimum conditions for safety and for longer wearing quality.

A tire which is underinflated will have the central portion of its tread somewhat concave with respect to the surface of the road, therefore, not in frictional contact therewith. Thus the major areas of road contact will be sustained by the two shoulder portions of each tire tread.

This condition reduces the total possible frictional contact area between the tire and the road surface, thereby increasing the tendency to skid or slide—also tending to crease and fracture the sidewalls.

The shift and distribution of the entire weight onto the shoulders also accelerates the wear on the shoulders, thereby decreasing the life of the tire.

Where the tire is overinflated, the tire tread has a pronounced convex shape in cross-section which concentrates the entire weight on the central portion with practically no road contact of the shoulder portions. Thus, the area of frictional contact between tire and road is reduced to a narrow central portion, therefore the wear on the central portion is accelerated, shortening the life of the tire.

The ideal condition is achieved when the air pressure in the tire is just sufficient to produce contact across the entire width of the tire with the road surface so that the weight of the car is equally borne by the shoulders and central portion of the four tires. In this instance, maximum frictional contact area between the tire tread and the road surface is achieved.

The equal distribution of weight also produces even wear across the entire width of the tread, thereby establishing optimum conditions for attainment of maximum tread life and maximum safety because of maximum friction or gripping of the tire on roadway surface.

Heretofore, in order to establish the correct pressure in a tire, a vehicle operator had to rely on visual inspection of the tire under load or on a recommended pressure as described in a manual. Neither of these techniques is reliable. It is difficult to visually determine whether a tire is overinflated or underinflated. It is equally unsuitable to inflate it to a pressure described in a manual because different sized tires and different loading and climate conditions require different tire pressures for the same vehicle. Therefore, a more accurate method was needed to measure and to adjust the air pressure to compensate for different loading conditions. For example, each time an additional passenger enters a car, the total weight is changed as well as the weight distribution. Also, when one having properly inflated tires loads the trunk heavily, as when preparing for a long vacation trip, the weight distribution and loading changes, making it desirable to put different pressures in different tires.

An object of my invention is to overcome all of said disadvantages and to provide a novel device which will enable safety or law enforcement agencies to set up permanent or temporary check stations to determine whether vehicles have tires which are properly inflated for safety purposes.

A more specific object of my invention is to provide a device which will accurately measure the distribution of the car load or weight over the width of the tread of the vehicle tires.

Another object of my invention is to provide a means for quickly and easily determining whether a vehicle tire is underinflated or overinflated.

Still another object of my invention is to provide a weighing device which can accurately measure and correct any deficiencies in tire pressure.

A still further object is to provide a means for detecting the precise curvature, that is, convexity or concavity of the cross-section of a vehicle tire when under load of the vehicle.

Another and further object is to compensate for variations made in the tire contour by the retreader.

Figure 4:
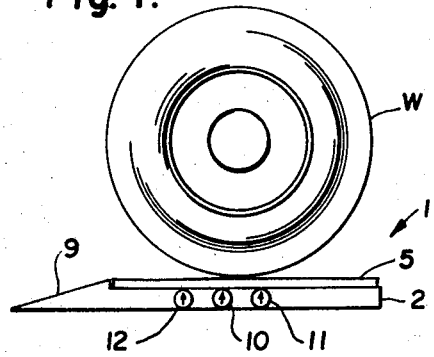
Figure 2:
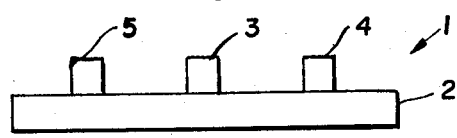
Figure 3:
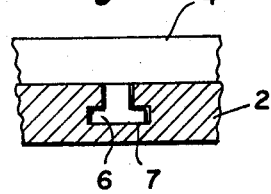
Figure 5:
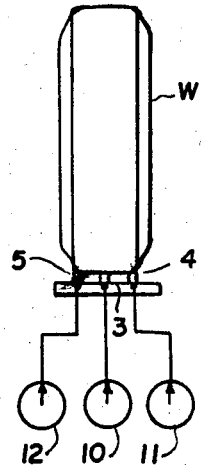
Figure 6:
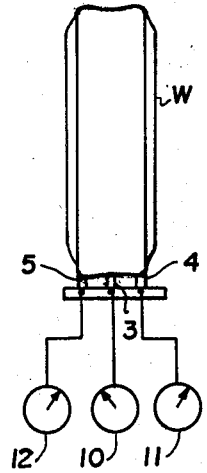
Figure 7:
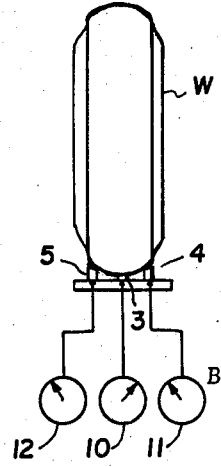

Other objects and advantages will become more apparent from a study of the following description taken with the accompanying drawing wherein:

FIG. 1 is an enlarged plan view of a weighing device embodying the present invention;
FIG. 2 is a side elevational view thereof;
FIG. 3 is a cross-sectional view of a weighing element taken along line III—III of FIG. 2;
FIG. 4 is a side view of the weighing device of FIG. 1 with a tire in the weighing position;
FIG. 5 is a partial schematic front view of a properly inflated tire on the weighing device;
FIG. 6 is a view similar to FIG. 5 except that the tire is underinflated; and,
FIG. 7 is a view similar to FIG. 5 except that the tire is overinflated.

Referring more particularly to FIG. 1 of the drawing, numeral 1 generally denotes a weighing device for accurately determining the road surface contact across the width of the tread of a vehicle tire W, comprising a base or platform 2 having a width which is wider than the width of the tread of tire W. Positioned on platform 2 and projecting above its surface are three pressure bars or weighing platforms 3, 4 and 5 which transmit the car load, on the center and shoulder portions of tire W, to three weighing devices or scales of any well known type. The weighing devices or scales are connected to indicator dials 10, 11 and 12, preferably arranged side by side on the platform side, so that the weights of the center and shoulder portions of tire W, as transmitted through platforms 3, 4 and 5 are separately shown on indicator dials 10, 12 and 11 respectively. To avoid damage to the scales, they may be either locked or retracted from their platforms while the vehicle is driven onto the platform and thereafter hydraulically lifted into place.

A ramp 9 forms the front end of platform 2. It may be desirable to use ramps at both ends (not shown) of platform 2 to facilitate the movement of the vehicle on and off the scales. Only one weighing assembly 1 is necessary for separately checking the pressure of all four vehicle tires by driving each wheel, separately, onto platform 1 as is done for vehicle wheel alignment. When checking the pressure of front wheels, it is desirable to provide a separate ramp unit 1, even without scales, to keep both front wheels at the same height. This is also true for the two rear wheels. For maximum speed of testing, four units such as shown in FIG. 1 should be simultaneously used, one for each wheel.

In operation, a vehicle wheel is driven onto platform 2 in such a manner that the width of the tire tread is in contact with pressure bars or platforms 3, 4 and 5. This can be done by having two or more ramp units to handle as many tires as are on the vehicle to be checked. Pressure bars 4 and 5 may be adjustably slid laterally by sliding on their supports 6 in grooves 7 by any suitable adjusting means so as to accommodate varying widths of vehicle tires. When the tire tread is in proper position, the indicator dial 10 will show the weight of the center of the tire and dials 11 and 12 will show the weight of the shoulder portions of the tire.

When a tire is properly inflated, that is, when maximum tread and road contact is achieved, its tread will be flat across its width and all three indicator dials will show approximately the same reading (as seen in FIG. 5), when supporting the car weight. If a tire is underinflated, the center dial will show a smaller value than dial 11 and 12 (see FIG. 6). If overinflated, dial 10 will show a value which is greater than dials 11 and 12 (as in FIG. 7).

While three scales and platforms are shown, it will be readily apparent that 4, 5 or a larger number may be used instead to obtain more than three sampling points across the tread.

The weighing device could be equipped with any well known air pressure system (not shown) to adjust the tire pressure to the proper value after measurement had taken place so that contact across the entire width of the tread will be made with the roadway surface.

The weighing device could be positioned below the surface of the road or testing area of a garage, as in a permanent arrangement, so that the pressure bars 3, 4 and 5 would be at the road level and thereby eliminate the need for a platform 2 and ramp construction 9.

While the above described scales comprise an efficient device for detecting the contour of the tire tread, which is a function of tire pressure, it will be readily apparent that other means for detecting excessive convexity or concavity of a tire tread, when carrying the weight of a car, may be used, instead, for the purposes of the present invention, but with less effectiveness.

For example, elements 3, 4 and 5, as shown in FIGS. 5, 6 and 7, may constitute separate electrical switches, such as limit switches, for example, mercury type switches, to give an indication, upon completion of separate circuits including indicators 10, 11 and 12, to denote which of the switches 3, 4 and 5 are making contact. Additional switches to the three described would give a more accurate indication of the weight distribution and contour of the tire tread.

Another modification is to employ strain gauges of any well known type, operated by platforms 3, 4 and 5 to measure actual pressure exerted by the tire at the points of contact of the tire with said platforms. Again, additional strain gauge elements may be provided along the width of the tire tread. Such strain gauges may be supported on a forked element hydraulically lifted sufficiently to completely support the vehicle weight.

Or perhaps light beams or ultrasonic beams may be projected at right angles to the plane of FIGS. 5, 6 and at the points of contact with elements 3, 4 and 5, which beams, when interrupted (or when continuous) while falling onto receivers represented by elements 3, 4 and 5, would likewise give an indication of the contour of the tread throughout its width, which, in turn, would indicate the pressure of the tire. In fact, any means for determining either the weight or pressure exerted by the tire across portions of the width of the tire tread or for determining the contour of a tire tread throughout its width when weighted by a car would come within the purview of the general principles of the present invention. It should be noted that the detection of the contour cannot be made of the tread while the tire is off the vehicle since in such case it may be convex in curvature, but when weighted by the car, the curvature will become perfectly flat across the width of the tread if the pressure is correct.

Thus it can be seen that I have invented an efficient measuring device for determining the surface contacting portions of the tread of a vehicle tire; also I have provided a device which will weigh portions of the vehicle weight carried by different portions extending across the width of the tread, such as the shoulder portions and central portion; and to vary the tire pressure until substantially equal weights are borne by said portions, to insure maximum gripping of the tire with the road surface and maximum tire life.

While I have illustrated and described several embodiments of my invention, it will be understood that these are by way of illustration only, and that various changes and modifications may be made within the contemplation of my invention.

I claim:

1. The method of inflating a vehicle tire with optimum pressure for maximum safety and tire life, comprising supporting the tire, while mounted on a vehicle, on a plurality of longitudinally extending weighing platforms spaced laterally of the width of the tire and determining the weight of the vehicle borne by the shoulder and central portions of the tread of the tire, and thereafter varying the pressure of the tire until the weights borne by said shoulder and central portions are substantially equal.

2. The method recited in claim 1 wherein three separate platforms are provided, two for supporting each of the shoulder portions and one for supporting the central portion of the tread.

3. The method recited in claim 1 together with the initial step of driving the mounted vehicle tire onto said plurality of longitudinally extending, weighing platforms spaced across the width of the tire for supporting the shoulder and central portions and determining the relative weights carried thereby.

4. Apparatus for determining abnormal pressure of a vehicle tire, comprising a plurality of scales disposed at spaced portions across the width of the tread of the tire, one of said scales including a longitudinally extending platform in substantially the medial plane of the tire for supporting the central portion of the tread and another of said scales including a longitudinally extending platform for supporting a shoulder portion of the tire, whereby the relative weights of the vehicle borne by said platforms may be determined.

5. Apparatus recited in claim 4 wherein three separate scales are provided, two at the shoulder portions and one at the central portion of the tread of the tire with longitudinally extending platforms in the central and lateral planes of the tire and that support the entire tread contacting areas on said platforms whereby the relative weights carried by said three weighing platforms may be determined.

6. Apparatus recited in claim 5 including a ramp for driving the tire onto said weighing platforms.

7. Apparatus as recited in claim 5 together with means for laterally adjusting the spacing between said platforms to accommodate different tire tread widths.

References Cited

UNITED STATES PATENTS

| 1,849,730 | 3/1932 | Morse | 73—146 |
| 2,051,042 | 8/1936 | Hendel et al. | 73—146 |
| 2,126,327 | 8/1938 | Hendel et al. | 73—146 |
| 2,313,156 | 3/1943 | Kratt | 73—146 |

DONALD O. WOODIEL, Primary Examiner